May 12, 1970  C. A. EMKE  3,511,263
SLACK REDUCER FOR FLEXIBLE LINES
Filed Oct. 26, 1967
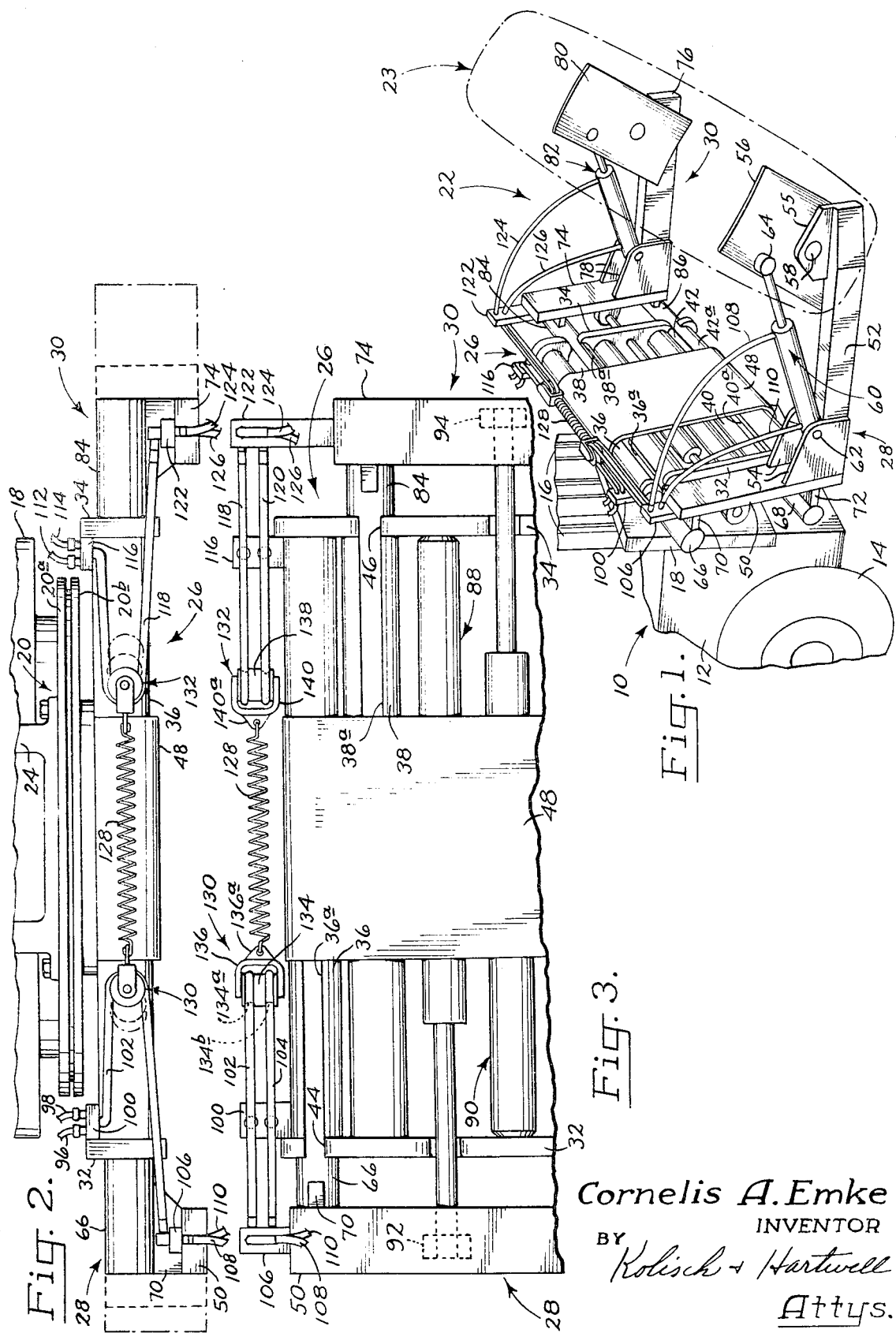
Cornelis A. Emke
INVENTOR
BY Kolisch + Hartwell
Attys.

United States Patent Office 3,511,263
Patented May 12, 1970

3,511,263
SLACK REDUCER FOR FLEXIBLE LINES
Cornelis A. Emke, Diemen, Netherlands, assignor to Cascade Corporation, Portland, Oreg., a corporation of Oregon
Filed Oct. 26, 1967, Ser. No. 678,445
Int. Cl. B60p 1/46
U.S. Cl. 137—355.17
8 Claims

ABSTRACT OF THE DISCLOSURE

A lift truck attachment including a frame and a pair of relatively movable, laterally shiftable clamping arms mounted for movement on the frame. Extending between the frame and arms for supplying power to equipment mounted on the latter, are spaced pairs of elongated flexible lines with each pair having one set of ends anchored on the frame and an opposite set of ends anchored on one of the arms. A pulley assembly is mounted for riding along the lines in each pair, and the two pairs of lines are pulley toward another, with the lines disposed in opposed reversed bends, by means of an elongated floating spring extending between the pulley assemblies.

---

This invention relates to line-handling apparatus, and more particularly, to such apparatus which operates to minimizes slack in elongated reaches of flexible lines that are provided in equipment to supply power between relatively movable parts in the equipment. A preferred embodiment of the invention is described herein in connection with an attachment for an industrial lift truck.

Various types of load-handling attachments are available which may be mounted on the elevatable carriage provided in the usual lift truck. Such attachments often include relatively movable parts which support power-operated devices that must be supplied power through lines extending from a remote power source located on the truck.

As an illustration, a conventional tie-handling attachment is available which includes a pair of opposed, relatively movable clamping arms adapted to clamp against diametrically opposite sides of a tire, with a fluid-power-operated rotating device provided on each arm for rotating a tire that is held between the arms. With such equipment mounted in operative position on a truck, and because of the relative movement afforded the clamping arms, spaced pairs of elongated, flexible lines are usually provided for supplying operating fluid from a source of pressure fluid mounted on the truck to the rotating devices carried on the arms. Typically, the portions of such lines extending from the truck toward the arms are exposed.

In the past, with this type of organization, line damage has been a frequent problem. This has been due largely to the lack of appropriate means in equipment for reducing slack in such lines and for holding them in protected positons even though they are exposed.

A general object of the present invention, therefore, is to provide, in equipment of the type generally mentioned, novel means for handling elongated flexible lines employed in the equipment whereby the above-indicated problems are taken care of in a practical and satisfactory manner.

More particularly, an object of the invention is to provide, in equipment where flexible lines extend between relatively movable parts in the equipment for supplying power between the parts, novel line-handling means adapted to act on the lines to reduce slack therein and to control the disposition thereof, whereby the lines are held in relatively protected positions in the equipment.

A related object is to provide such line-handling means which is adapted to act continually on the lines, yet which does not interfere with line movement that is necessary to accommodate relative movement between the parts in the equipment.

According to an embodiment of the invention, a pair of spaced, elongated, flexible power supply lines extend between a base frame in a lift truck attachment and an assembly mounted for movement on the base frame. The lines have one set of ends anchored at spaced-apart points on the frame, and an opposite set of ends anchored at spaced-apart points on the assembly, with the lines extending in oppositely disposed reverse bends between their sets of ends. Extending between and pulling toward one another the bends of the lines is an elongated floating spring, with spaced pulley assemblies mounting opposite ends of the spring for riding along the lines.

In such an organization, the spring acts continually to tense and to minimize slack in the lines, and to hold them in relatively protected positions in the equipment. The spring, however, while thus reducing the slack in the lines, does not prevent them from moving the amounts necessary to accommodate relative movement between the frame and assembly. In addition, and because the spring floats between the lines, slack in the lines is always held to a minimum regardless of their positions relative to one another and to the frame. Thus, non-centering of the lines relative to the frame poses no problem.

Further describing the organization herein, elongated flexible line continuations are provided which communicate with the above-mentioned lines, and which cooperate with such lines to supply power to a pair of power-operated agencies mounted on the movable assembly. Because such line continuations may undergo slack changes with operation of the power-operated agencies, another object of the invention is to provide novel means for connecting the lines and line continuations whereby the former are isolated from slack changes that occur in the latter. In a preferred embodiment of the invention, the connecting means affording such isolation comprises a pair of novel anchoring devices that anchor sets of ends of the lines on the movable assembly.

Yet another object of the invention is to provide line-handling apparatus of the type so far indicated which is relatively simple and compact in construction.

These and other objects and advantages attained by the invention will become more fully apparent as the description which follows is read in conjunction with the accompanying drawings, wherein:

FIG. 1 is a fragmentary perspective view illustrating the front part of an industrial lift truck, with a tire handler mounted on the truck employing line slack-reducing apparatus constructed according to the invention;

FIG. 2 is an enlarged fragmentary top plan view illustrating further details of the slack-reducing apparatus shown in FIG. 1; and FIG. 3 is a fragmentary front elevation of such apparatus taken from the bottom of FIG. 2.

Turning now to the drawings, and considering particularly FIG. 1, indicated generally at 10 is the front part of a conventional industrial lift truck, including the usual frame 12, and front wheel assemblies, such as wheel assembly 14, supporting the frame for movement over the ground. Suitably mounted on the front of frame 12 is a conventional upright telescopic mast structure 16, and mounted for movement up and down on the mast structure is the usual upright carriage illustrated at 18.

Mounted on the front face of carriage 18 through a rotator 20 (FIG. 2) is an attachment 22 for handling tires, such as the one indicated generally in phantom outline at 23. Rotator 20 includes an upright base plate 20a anchored to the front face of carriage 18, and a relatively rotatable upright face plate 20b mounted on plate 20a for rotation about an axis extending normal to the planes of plates 20a, 20b. Plate 20b is rotated under power by means of a conventional fluid-operated motor 24 which is mounted on the back of plate 20a, with a suitable driving connection established between the motor and plate 20b.

Attachment 22, in general terms, includes a base frame 26 and a pair of opposed, relatively movable clamping arms, or parts, 28, 30 mounted for movement on the base frame. Arms 28, 30 constitute a movable assembly herein. In order to obtain clarity in FIG. 1, the attachment has been rotated to a tilted position relative to carriage 18.

Considering the construction of frame 26, and referring now to all of the figures, it includes a pair of elongated, spaced, parallel end plates 32, 34, with elongated, substantially parallel tubes 36, 38, 40, 42 extending between and joined to the end plates. Opposite ends of the tubes extend through appropriate bores (not shown) provided in plates 32, 34 with such ends exposed. Extending inwardly part way along the front faces of tubes 36, 40 from the ends thereof that are joined to plate 32 are elongated slots 36a, 40a, respectively, that open to the hollow interior of the tubes. Similar slots 38a, 42a extend along the front faces of tubes 38, 42 from the ends thereof that are joined to plate 34. Along their forward edges, plates 32, 34 are provided with openings that communicate with the slots in the tubes. Referring particularly to FIG. 3, a pair of such openings 44, 46, are shown in plates 32, 34 opening onto slots 36a, 38a, respectively. The frame further includes a central member 48 joined to and supporting the central portions of the tubes.

Turning now to the clamping arms in attachment 22, arm 28 includes an elongated base 50 which substantially parallels plate 32, and a forwardly projecting bar 52 joined to the base through a pair of spaced support plates 54. The forward end of bar 52 is provided with a bracket 55, and a clamping pad 56 is pivotally mounted at 58 on the bracket. The pivot axis provided for pad 56 by pivot connection 58 extends transversely between the arms, in front of and substantially parallel with the plane of frame 26. Pad 56 is disposed against one side of tire 23.

Clamping pad 56 is rotated under power, as for example to the forwardly tilted position shown relative to bar 52, by means of a ram, or power-operated agency, 60. Ram 60 has its cylinder end pivotally connected at 62 to plates 54, and its rod end pivotally connected at 64 to the pad at a point spaced from pivot connection 58.

Arm 28 is mounted for lateral shifting on frame 26 through a pair of elongated cylindrical bars 66, 68 which are slidably received in tubes 36, 40, respectively, and a pair of plates 70, 72 which join bars 66, 68 to the back face of base 50 in the arm. With shifting of the arm on the frame, plates 70, 72 slide freely in slots 36a, 40a, and through the openings in plate 32 communicating with these slots.

Clamping arm 30 is similar in construction to arm 28, and thus includes a base 74 corresponding to base 50, a forwardly projecting bar 76 corresponding to bar 52 supported on base 76 through plates 78 corresponding to plates 54, and a rotatable clamping pad 80 corresponding to clamping pad 56 pivotally mounted adjacent the forward end of bar 76. The pivot axis provided for pad 80 coincides with that provided for pad 56. In FIG. 1, pad 80 is disposed against a diametrically opposite side of tire 23 from pad 56. Clamping pad 80 is rotated under power by means of a ram, or power-operated agency, 82 corresponding to ram 60.

Arm 30 is mounted for lateral shifting on the frame through elongated cylindrical bars 84, 86, corresponding to bars 66, 68, joined to the back of base 74 and slidably received within tubes 38, 42.

Considering particularly FIG. 3, clamping arms 28, 30 are shifted on frame 26 by means of fluid-operated rams 88, 90, respectively, which extend transversely of the frame with the rams substantially paralleling the tubes in the frame. Ram 88 has its cylinder end suitably fastened to plate 34, and its rod end connected to the back face of arm base 50 through a lug 92 (shown in dashed outline). Ram 90 has its cylinder end anchored to plate 32 in the frame, and its rod end fastened to the back of arm base 74 through a lug 94 (also shown in dashed outline). Pressure fluid for operating rams 88, 90 is supplied in any suitable manner from the usual source of pressure fluid (not shown) provided on truck 10.

Describing now how operating fluid is supplied to previously-mentioned rams 60, 82 on the clamping arms, and considering first the supply of fluid to ram 60, pressure fluid for this ram is made available from the source on the truck through a pair of lines, shown partially at 96, 98, which have forward ends suitably connected to a junction block, or anchoring device, 100 secured to plate 32. Through device 100, lines 96, 98 communicate with a pair of elongated, flexible lines 102, 104, respectively, which are provided to accommodate relative movement between frame 26 and arm 28 while supplying fluid from the former to the latter. Thus, lines 102, 104 have one set of ends connected to another junction block, or anchoring device, 106 fastened to the back of arm base 50. Lines 102, 104, which constitute first and third lines herein, respectively, have substantially the same length, and are disposed in adjacent, matching, reversely bent courses between the anchoring devices, as can be seen clearly in FIG. 2.

Anchoring devices 100, 106, in addition to accommodating communication with opposite ends of lines 102, 104, also serve positively to control the relative movement permitted between the ends of the lines. In particular, the anchoring devices limit relative movement of the ends to only that which occurs between the devices themselves. Because of this, devices 100, 106 help to assure that lines 102, 104 at all times undergo similar changes in slack.

Through anchoring device 106, lines 102, 104 communicate with a pair of lines, or line continuations, 108, 110, respectively, which extend from the anchoring device to opposite ends of the cylinder in ram 60. As can be seen in FIG. 1, line 108, which extends to the forward end of the cylinder, is some what longer than line 110 which extends to the rear end of the cylinder. With operation of ram 60 to rotate clamping pad 56, lines 108, 110 accommodate the relative movement that occurs between the ram's cylinder and anchoring device 106, with such lines undergoing differing changes in slack. It will be noted, however, that such differing slack changes are not transmitted through anchoring device 106 to lines 102, 104, but rather are isolated to lines 108, 110.

Operating fluid is furnished in a similar manner to ram 82. Thus, pressure fluid is supplied from the source on the truck through a pair of lines shown partially at 112, 114 corresponding to lines 96, 98. Lines 112, 114 have forward ends connected to a junction block, or anchoring device, 116 corresponding to device 100 secured to frame plate 34. Through device 116, lines 112, 114 communicate with a pair of lines 118, 120 corresponding to lines 102, 104. Lines 118, 120 are provided for accommodating relative movement between frame 26 and arm 30. Thus, lines 118, 120 have one set of ends connected to device 116, and an opposite set of ends connected to another junction block, or anchoring device, 122 corresponding to device 106 fastened to the back of arm base 74. Lines 118, 120 constitute second and fourth lines herein, respectively, and like lines 102, 104, are disposed in adjacent, matching, reversely-bent courses between their ends.

Through anchoring device 122, lines 118, 120 communicate with a pair of lines, or line continuations, 124, 126, respectively, which correspond to lines 108, 110. Lines 124, 126 extend to opposite ends of the cylinder in ram 82, with line 124 being somewhat longer than line 126.

In order to minimize the possibility of damage occuring to lines 102, 104 and 118, 120 due to the presence of too much slack in the lines, means is provided according to the invention which cooperates with anchoring devices 100, 106, 116, 122 to reduce slack in these lines. In a preferred embodiment of the invention, such means comprises an elongated spring, or biasing means, 128 which pulls the pairs of lines toward one another through pulley assemblies 130, 132 which mount the opposite ends of the spring for riding along the lines. It will be noted that spring 128 acts as a floating spring between the pairs of lines.

More specifically, and describing pulley assembly 130, it includes a wheel 134 journaled within a loke 136. Wheel 134 is positioned for riding along lines 102, 104 with the bends of such lines received within a pair of channels 134a, 134b provided on the wheel. Yoke 136 includes a projecting ear 136a, and the left end of spring 128 in FIGS. 2 and 3 is connected to this ear. Pulley assembly 132 is similar in construction to assembly 130, and thus includes a wheel 138 corresponding to wheel 134 riding along lines 118, 120 journaled within a yoke 140. Yoke 140 has an ear 140a connected to the right end of spring 128 in FIGS. 2 and 3.

Spring 128 is sized so that for all positions that pairs of lines 102, 104 and 118, 120 assume relative to one another during movement of the clamping arms, the spring remains under tension.

Explaining now how slack in lines 102, 104 and 118, 120 is maintained at a minimum during operation of the apparatus described herein, with shifting of clamping arms 28, 30 to different relative positions, the wheels in the pulley assemblies ride along the lines accommodating line movement and assuring that the assemblies always remain positioned at the opposed bends in the pairs of lines. Spring 128 remains under tension for all relative positions of the arms, and acts continually through the pulley assemblies to draw lines 102, 104 toward lines 118, 120. In particular, the spring acts to pull the lines toward protected positions where they are held above, and inwardly on, attachment 22.

An important feature of the invention contributing to effective action of spring 128 is that the spring floats between lines 102, 104 and 118, 120. Thus, proper functioning of the spring does not depend upon the clamping arms and pairs of lines 102, 104 and 118, 120 remaining exactly centered relative to opposite to opposite sides of frame 26. This is illustrated in FIG. 2 where several positions are shown for the arms and the pulley assemblies.

In solid outline, the arms and pulley assemblies are shown in one set of positions where they, and spring 128, are centered on the frame. In dashed outline the arms and pulley assemblies are shown in another set of positions where they are moved apart somewhat from the solid outline positions, but are still, together with the spring, centered on the frame. In dash-dot outline, the arms and pulley assemblies are shown in positions where they are moved still further apart, but in this case, they are no longer centered relative to the frame. This is because arm 30 is spaced further to the right of the frame than is arm 28 spaced to the left of the frame. However, this poses no problem regarding proper action of spring 128 since there is nothing to anchor spring 128 in place. Thus, the spring is free is shift an appropriate amount to accommodate such noncentering of arms and pulley assemblies.

It will be apparent, therefore, that spring 128, while acting on lines 102, 104, 118, 120 to reduce slack therein, accommodates not only relative movement between the clamping arms with such remaining centered relative to frame 26, but also accommodates shifting of the arms to a noncentered position on the frame.

Anchoring devices 100, 106, 116, 122 cooperate in minimizing slack in lines 102, 104, 118, 120 by providing firm anchoring points for opposite sets of ends of the lines. In particular, the anchoring devices limit the relative movement permitted between the sets of line ends solely to that which occurs between the anchoring devices themsevles. Thus, the anchoring device isolate the lines from slack changes that occur in lines that connect with lines 102, 104, 118, 120. More specifically, devices 106, 122 completely isolate lines 102, 104, and 118, 120 from any slack changes that occur, during operation of rams 60, 82, in lines 108, 110 and 124, 126. Devices 100, 116, on the other hand, isolate lines 102, 104, 118, 120 from slack changes that occur in lines 96, 98 and 112, 114 during operation of rotator 20 and movement of carriage 18.

It will be apparent, therefore, that the novel apparatus described herein provides conveniently for the reduction of slack in exposed lines which must extend between relatively movable parts. Thus, the apparatus serves to minimize considerably the likelihood of damage occurring to such lines. In addition, it will be noted that the apparatus proposed (including the anchoring devices, the pulley assemblies, and spring 128) is relatively simple and compart, and is readily adaptable to various types of equipment.

While a preferred embodiment of the invention is described herein, it is appreciated that variations and modifications may be made without departing from the spirit of the invention. Accordingly, it is desired to cover all such variations and modifications which would be apparent to those skilled in the art and that come within the scope of the appended claims.

It is claimed and desired to secure by Letters Patent:

1. In a lift truck attachment including a base frame and a pair of parts mounted on said frame for movement relative to one another,
   first and second elongated flexible lines for supplying power from the base frame to said parts,
   first anchoring means anchoring one set of ends of said lines at spaced-apart points on said base frame, and another anchoring means anchoring each end in the opposite set of ends of said lines on a different one of said parts, with said lines extending in oppositely disposed reverse bends between said sets of ends,
   elongated biasing means extending between and pulling toward one another said reverse bends, and
   means mounting the ends of said biasing means on said lines accommodating riding of such ends along said lines.

2. The apparatus of claim 1, wherein said biasing means comprises an elongated floating spring.

3. The apparatus of claim 1 which further comprises third and fourth elongated flexible lines disposed adjacent said first and second lines, respectively, also for supplying power from the base frame to said parts, having one set of ends anchored at spaced-apart points on said base frame through said first anchoring means, and each end in the opposite set of ends anchored on a different one of said parts through said other anchoring means, said third and fourth lines having configurations, including oppositely disposed reverse bends, matching those of said first and second lines, respectively.

4. The apparatus of claim 3, wherein the opposite ends of said biasing means are also mounted through said mounting means for riding on said third and fourth lines, and said biasing means also operates to pull toward one another said reverse bends in said third and fourth lines.

5. The apparatus of claim 4, wherein said biasing means comprises an elongated floating spring.

6. The apparatus of claim 5, wherein said mounting means comprises a pair of spaced pulley assemblies operatively connected to opposite ends of said spring.

7. The apparatus of claim 4, wherein said other anchoring means comprises a pair of spaced-apart anchoring devices, each anchoring ends of a pair of said lines on a different one of said parts, a pair of power-operated agencies are included with each mounted on a different one of said parts and at a location spaced from the anchoring device on the part, and, considering each anchoring device, a pair of elongated flexible line continuations communicate through the device with the lines anchored thereby, said line continuations extending away from the device toward one of said power-operated agencies and providing for the supply of power to the agency, the respective line continuations in said pair of line continuations undergoing differing changes in slack with operation of the agency, and the anchoring device isolating such slack changes from the lines anchored by the device.

8. The apparatus of claim 7, wherein said parts comprise a pair of relatively movable arms which are shiftable toward and away from opposite sides of said base frame.

References Cited

UNITED STATES PATENTS

| | | | |
|---|---|---|---|
| 1,468,620 | 9/1923 | Addy | 137—355.23 |
| 2,953,269 | 9/1960 | Hall et al. | 214—653 |

DORSEY NEWTON, Primary Examiner

U.S. Cl. X.R.

214—653